United States Patent [19]
Arai et al.

[11] Patent Number: 5,319,758
[45] Date of Patent: Jun. 7, 1994

[54] METHOD FOR MANAGING MULTIPLE VIRTUAL STORAGES DIVIDED INTO FAMILIES

[75] Inventors: Toshiaki Arai, Sagamihara; Toshiharu Shinozaki, Yokohama, both of Japan

[73] Assignee: Hitachi, Ltd., Tokyo, Japan

[21] Appl. No.: 472,311

[22] Filed: Jan. 30, 1990

[30] Foreign Application Priority Data

Feb. 1, 1989 [JP] Japan .................. 1-020879

[51] Int. Cl.⁵ ........................... G06F 12/02
[52] U.S. Cl. ................... 395/400; 395/425; 264/DIG. 1
[58] Field of Search ... 364/200 MS File, 900 MS File; 395/400, 425

[56] References Cited

U.S. PATENT DOCUMENTS

| | | | |
|---|---|---|---|
| 4,355,355 | 9/1982 | Butwell et al. | 364/200 |
| 4,388,685 | 6/1983 | Kotok et al. | 395/400 |
| 4,456,954 | 6/1984 | Bullions, III et al. | 395/400 |
| 4,521,846 | 6/1985 | Scalzi et al. | 364/200 |
| 4,779,191 | 10/1988 | Greenblatt | 395/400 |
| 4,835,734 | 5/1989 | Kodaira et al. | 395/400 |
| 4,985,828 | 1/1991 | Shimizu et al. | 364/200 |
| 5,023,777 | 6/1991 | Sawamoto | 395/400 |
| 5,095,420 | 3/1992 | Eilert et al. | 395/400 |

FOREIGN PATENT DOCUMENTS

| | | |
|---|---|---|
| 200911 | 12/1986 | European Pat. Off. ..... G06F 12/10 |
| 57-006481 | 1/1982 | Japan . |
| 60-068443 | 4/1985 | Japan . |
| 63-231550 | 9/1988 | Japan . |
| 63-305443 | 12/1988 | Japan . |

OTHER PUBLICATIONS

Y. Yoshizawa, "Practical Operating System", Chapter 3-Vitual Memory Method, pp. 85-124, Shokodo Ltd., 1984.
IBM System Journal, vol. 28, No. 1, 1989, Armonk, New York, U.S. pp. 124-150; C. E. Clark: The facilities and evolution of (ESA/370 TM).
"HITAC Computer Program Product V053/ES General Descriptions", pp. 229-304.
S. E. Madnick et al., "Operating System", pp. 181-185, McGraw-Hill Book Co., 1974.

Primary Examiner—Joseph L. Dixon
Assistant Examiner—Hiep T. Nguyen
Attorney, Agent, or Firm—Antonelli, Terry, Stout & Kraus

[57] ABSTRACT

A multiple virtual storage management method which requests, by a first program allocated to a first virtual space, subordination of the first virtual space to a first one of the space families at a timing determined by the first program, subordinates the first virtual space to the first family, in response to the request for subordination, requests, by a second program allocated to a second virtual space which is subordinated to a second one of the space families, secession from the second space family at a timing determined by the second program and permits the second virtual space to secede from the second space family in response to the request for secession.

12 Claims, 9 Drawing Sheets

METHOD FOR MANAGING MULTIPLE VIRTUAL STORAGES DIVIDED INTO FAMILIES

BACKGROUND OF THE INVENTION

This invention relates to a method of management of multiple virtual storages for a large computer system, and particularly to a multiple virtual storage management method capable of easily referencing from one space to different virtual spaces (other than the one space).

In an information processing system based on a multiple virtual storage, a virtual storage space (virtual space) is provided by using an address translation mechanism which translates a virtual address into a real address. The address translation mechanism creates virtual space by using a set of translation tables. By having a plurality of translation tables and using these tables selectively, multiple virtual spaces are realized.

An example of the multiple virtual storage is the program product VOS3 ES1 which is an operating system running on the HITAC M-series processor. (Refer to "HITAC computer program product VOS3/ES General Descriptions", pp. 299–304 (manual number: 8091-3-001-20(E)), published by Hitachi Ltd.) In this example, a segment table and a plurality of page tables are prepared for a virtual space, and a virtual address is translated to a real address by using two-stage conversion tables with the intention of reducing the total amount of translation tables and simplifying the operation of a table. A plurality of virtual spaces are processed sequentially by switching the segment tables. By setting the same value for the entries of segment tables or page tables of different spaces, it is possible to establish common areas having the same address in different spaces. The above-mentioned translation is a known technique in the field of large computer systems, and its details are described, for example, in publication "Practical Operating Systems", Chapter 3: "Virtual Memory Method", pp. 85–124, written by Yasuhumi Yoshizawa (published by Shokodo Ltd. ISBN 4-7856-3503-7).

In these multiple virtual storage methods, it is infeasible to make reference or revise data in areas other than the common area of other virtual space, so far as the main storage is referenced by way of the address translation, and therefore the reliability and security of data are high. On the other hand, however, the high independence of virtual spaces imposes the difficulty of communication among the virtual spaces. The reason is that segment tables must be switched in making reference to other space, and once the segment table is switched, the contents of the original virtual space cannot be referenced. On this account, it is a general expedience to place data, which are common among virtual spaces, in the common areas, at the risk of inferior data security due to its accessibility from all virtual spaces. In order to overcome this problem, there are disclosed several techniques which reduce the overhead of inter-space communication, while retaining the advantage of the multiple virtual storage method.

A publication of JP-A-57-6481 enables the transfer of data and control among spaces by using two sets of address translation tables simultaneously.

JP-A-58-118081 establishes a shared virtual space in the system and provides the same contents of segment table entry for the area of the shared virtual space and an arbitrary area of other arbitrary virtual space, so that the areas are shared.

JP-A-60-68443 discloses a virtual machine system having an address translation for which an area common to each virtual machine can be established.

JP-A-63-231550 discloses an address translation having an enhanced translation speed by grouping a [plurality of virtual spaces and using the multiple virtual storages and address look a side buffers (TLB) for each group effectively.

The technique of the above-mentioned JP-A-57-6481 is intended to make simultaneous reference to a plurality of spaces, and it has a problem of intricate environmental setting for the reference and the need for the management of pertinent information entirely on the part of the application program. Namely, although the technique of JP-A-57-6481 enables the simultaneous access to two spaces, it entirely relies on the user for the management of information which indicates the space and address of each specific data.

The technique of the JP-A-63-118081 necessitates the setup of a special shared virtual space, and therefore it lacks in the general-purpose property In addition, because of the accessibility of areas in the shared virtual space from any space, the ability of data security is the same as of the conventional system common area.

The technique of JP-A-60-68443 is intended for data sharing among virtual computer systems, and it cannot be applied directly to the operating system based on the multiple virtual storage method. Although the JP-A-63-23155 does not involve this problem, it merely describes for the multiple virtual storage and grouping of a plurality of spaces into families, and particularly it describes the details of the address translator for such multiple virtual storage. This patent publication not only fails to mention the formation of space families and the formation of common area in each space family, but does not describe about the structure of segment tables and page tables and the procedure of their organization which are the premises of using the address translator. Therefore it is not clear how to share data. Moreover, in a practical program execution, a program placed in a specific space varies with time, and therefore the grouping of spaces into a same family also varies. The conventional technique does not disclose the matter.

Japanese Patent Application No. 62-141466 filed on Jun. 8, 1987 by the applicant of the present invention, entitled "Virtual Space Group Management Method" offers the function of simultaneous reference to a plurality of virtual spaces by compressing a plurality of segment tables into a single table.

The patent application 62-141466 (or corresponding Japanese Patent Unexamined Publication JP-A-63-305443) does not overcome the problem described above in connection with the patent publication 57-6481, and the management of data address for data reference, also in the case of connected spaces, relies on the user. The patent application 62-141466 describes nothing about the addressing for the expanded virtual space which is created by connecting a plurality of spaces.

SUMMARY OF THE INVENTION

An object of the present invention is to provide, for the user, means for data sharing and easy data reference among virtual spaces without imposing the management of the above-mentioned environment setting information on the user, while retaining the high data security which is the advantage of the multiple virtual storage method.

In order to achieve the above objective, the inventive multiple virtual storage management method includes the steps of:

(a) requesting, by a first program allocated a first virtual space subordination of the first program to a first one of the space families at a timing determined by the first program;

(b) subordinating said first virtual space to the first family, in response to the requesting of subordination;

(c) requesting, by a second program allocated to a second virtual space subordinated to a second one of the space families, secession of the second virtual space from second space family at a timing determined by said second program; and (d) letting the second virtual space secede from the second space family in response to the requesting for the secession.

More specifically, the inventive multiple virtual storage management method includes a step of letting the first virtual space belong to the first space family even if the first virtual space is a portion which already belongs to the second space family.

In a more preferable aspect, the inventive multiple virtual storage management method includes the steps of:

(a) declaring, by a program placed in a virtual space (parent space), creation of a new space family, and specifying an address and size of a family common area to be formed in the space family;

(b) forming a family common area in the parent space;

(c) declaring, by programs placed in a plurality of other virtual spaces (child spaces), subordination of the vertical spaces to the space family; and (d) establishing a family common area with the size in the address which has been specified by the parent space in an individual area of the child spaces.

More preferably, the inventive multiple virtual storage management method includes the steps of:

(a) declaring, by a program placed in a first virtual space which belongs to a space family, data placed in the first virtual space to be in-family shared data that is accessible from other virtual spaces within said space family;

(b) placing shared data management data pertinent to an identifier, data length and real address of an address conversion table used for the reference of the data to the family common area of the space family;

(c) accessing by the program placed, in a second virtual space in the space family, the shared data management data;

(d) assigning a window area used for accessing the shared data to the second virtual space in accordance with the shared data management data which has been accessed; and (e) altering the contents of an entry corresponding to the window among entries of segment tables of the second virtual space so as to indicate a page table assigned to in-family shared data in a page table group for the first virtual space, in accordance with the shared data management data which has been accessed.

DESCRIPTION OF THE PREFERRED EMBODIMENTS

Embodiments of this invention will be described with reference to the drawings.

Figure 1:
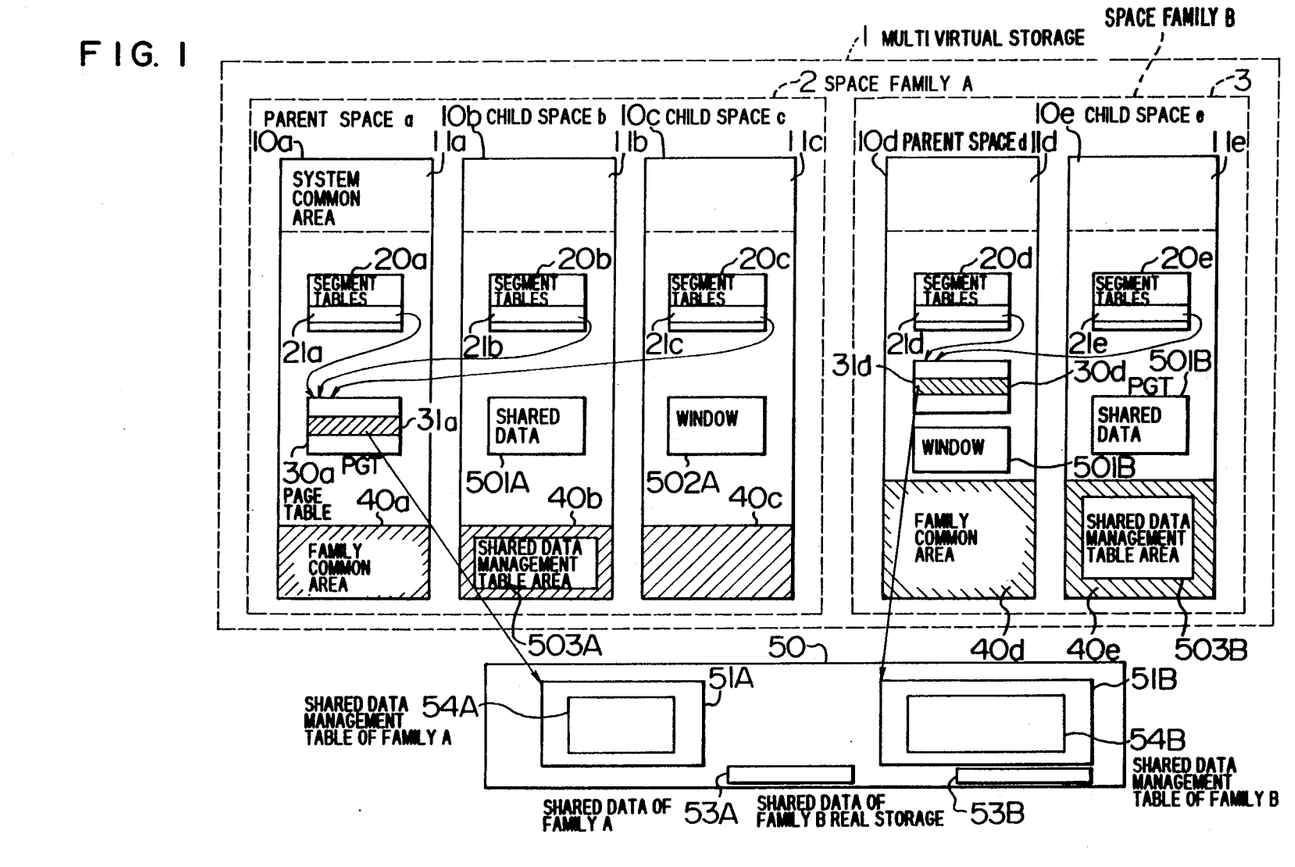
FIG. 1 is a diagram showing in brief the space family group of the multiple virtual storage according to this invention.

FIG. 1 shows the arrangement of space families and the method of referencing family common areas according to this invention. A multiple virtual space 1 includes a space family A (2) and a space family B (3). The space family A includes as members a space a (10a), a space b (10b) and a space c (10c), and the space family B includes as members a space d (10d) and a space e (10e). A feature of the space family arrangement is that common areas (family common areas) 40a, 40b and 40c are provided for all spaces that belong to the space family A and similarly family common areas 40d and 40e are provided for all spaces that belong to the space family B, as will be explained in the following.

Figure 2:
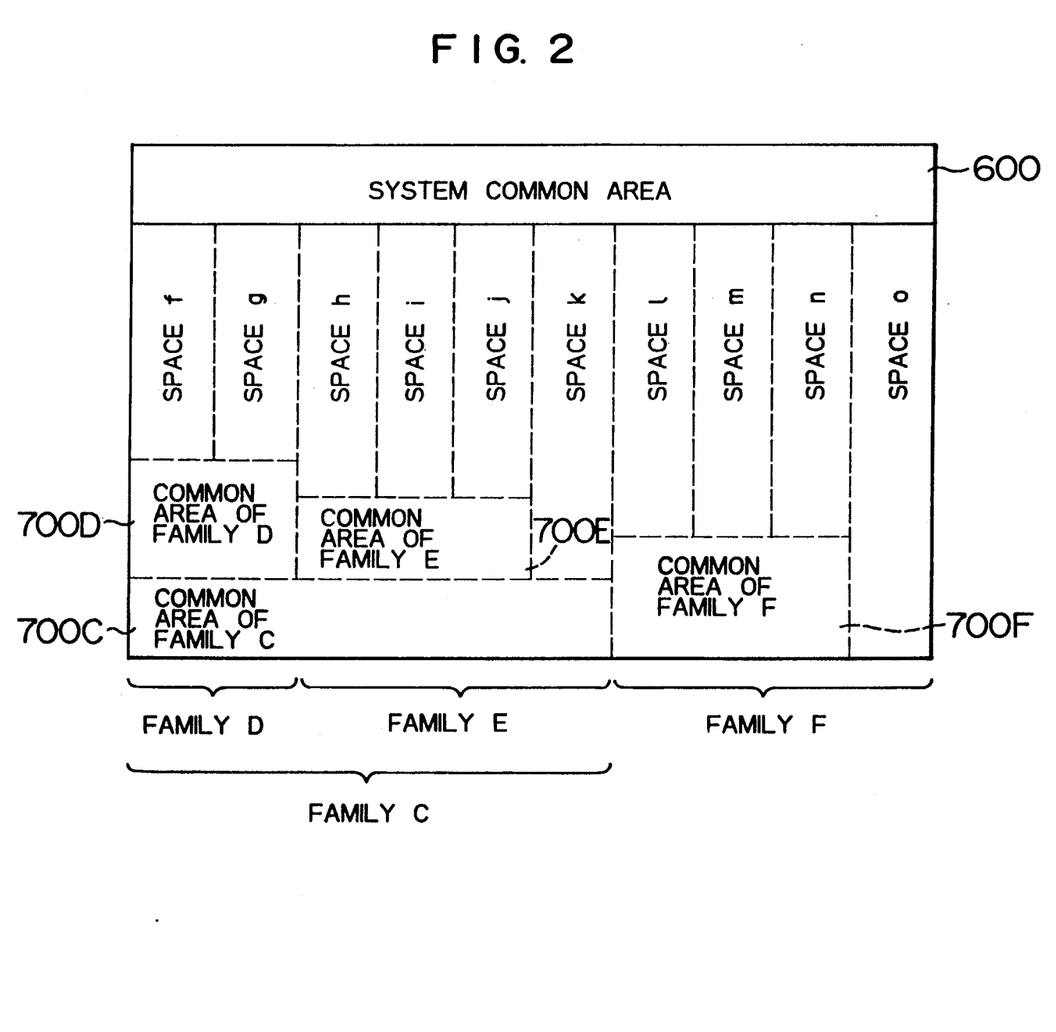
FIG. 2 is a diagram showing in brief another space family group in hierarchical formation according to this invention.

According to this invention, it is also possible to arrange space families in hierarchical fashion as shown in FIG. 2. In this case, among spaces f through k that belong to a highest-level space family C, the spaces f and g form a second-level space family D, and the spaces h through j form a second-level space family E, and partial space groups that belong to one family C can form other families. Only family c belongs to the space k. In this case, according to this invention, a family common area 700C for the family C is formed in the spaces f and g, and among the spaces f through k, a common area 700D for the family D is formed in the spaces f and g, and a common area 700E for the family E is formed in the spaces h through j.

In FIG. 2, among spaces l through o that do not belong to the family C, the spaces l through n form another first-level family F, and it is assumed that the space o does not belong to any family. Indicated by 600 is a system common area. In the figure, portions that belong to the spaces of the system common area 600 and family common areas 700C to 700F are shown without distinction for the simplicity of drawing. However, the provision of the family common areas 700C to 700F in the individual area of each space and the method of access to the family common areas are identical to the case of FIG. 1 as will be explained later.

Needless to say, only programs in spaces that belong to the same family can access to the common area for that family. For example, the space h can access to the common area 700C of family C and the common area 700E of family E, but it cannot access to the common area of family D. Accordingly, the hierarchical formation of space families provides the precise protection ability for data shared among programs in different spaces.

This embodiment has the following features.

(1) A plurality of virtual spaces are grouped (space families), the space of the same space family is provided in its individual area with an area common to the family (family common area), a program executed in any virtual space within each space family is allowed to access to the family common area of its family, and programs executed in virtual spaces that belong to other spaces are inhibited from accessing to that family common area.

(2) A program of an arbitrary virtual space in the information processing system creates a new space family at an arbitrary timing, and it is allowed to belong to an existing space family, so that the number of space families existing in the information processing system and/or a set of virtual spaces that form each space family is altered dynamically.

(3) A program running in one virtual space (parent space) declares the creation of a space family and specifies the address and size of the family common area of its family, and next programs running in a plurality of other virtual spaces (child spaces) declare to belong to that space family, and family common areas are provided at the address, which have been specified by the parent space, in the individual areas of the child spaces.

(4) At the declaration of subordination of one program running in a child space to one family, the segment table entry of the child space corresponding to the family common area is altered so as to point the page table of the family common area of the parent space, thereby establishing a family common area which holds data that is identical for the parent and child spaces.

(5) At the declaration of subordination of one program in the child space to one family, the contents of the page table of the family common area of the parent space are copied to the page table of the family common area of that child space, thereby establishing a family common area which holds data that is identical for the parent and child spaces.

(6) A program running in a virtual space which belong to one space family declares the creation of a space family, and a virtual space is allowed to belong to a plurality of space families.

(7) In case a program in one virtual space has declared to belong to a space family, a set of families to which the parent space of the family of subordination only in case it is a subset of the set of families to which the parent space of the family of subordination declaration belong, thereby allowing the formation of a hierarchical family group.

(8) The real storage assigned to the family common area implements, as an area which belongs to the parent space, the resource management, and in case a child space is swapped out, nothing is implemented for the page table that corresponds to the family common area and the real storage, and at the swap-in process the page table of the family common area of the parent space of the family is indicated to the entry that corresponds to the family common area of the segment table of the child space, thereby performing the real storage management for the family common area.

(9) The real storage assigned to the family common area implements, as an area which belong to the parent space, the resource management, and in case a child space is swapped out, nothing is implemented for the page table that corresponds to the family common area and the real storage, and at the swap-in process, the content of the page table of the family common area of the parent space of the family is copied to the page table that corresponds to the family common area of the child space, thereby performing the real storage management for the family common area.

(10) The following steps are provided.

(i) A step in which a program running in a virtual space that belongs to one space family declares that data placed in its virtual space can be accessed from other virtual space within the space family (in-family shared data).

(ii) A step of assigning an area for storing the identifier of the in-family shared data, data length and the real address of address translation table used for the reference of the data to the above-mentioned family common area.

(iii) A step in which a program running in another virtual space within the space family assigns a window area for accessing its data, with the entries of segment tables of other spaces and the entry of the window being altered to point to the page table assigned to the in-family shared data area among a group of page tables of the space assigned to the common data within the family.

According to this invention, a plurality of virtual spaces in a system are grouped into space families, with each space family being provided with a family common area that can be referenced by only the space family, whereby it becomes possible to share data and revise data among spaces that belong to the family by way of the family common area. The family common area cannot be referenced from virtual spaces that do not belong to the relevant family, and illegal data reference from the exterior of family is prevented. Accordingly, it becomes possible to easily reference shared data, while retaining the data security. The creation of a new space family and the subordination to an arbitrary space family at an arbitrary time point are allowed, and it becomes possible to restrict communicable virtual spaces and data which can be referenced depending on the variation, on the time axis, of the authority of virtual space.

As a condition of subordination to one space family, a condition that a set of families to which a space in subordination request already belongs is a subset of families to which the parent space, against which the subordination has been declared, is provided, whereby the merging of families subsides and "ring protection" is made possible.

An area for storing the in-family shared data, data length and the real address of address translation table used for the reference of the data to the family common area is assigned to the family common area, and it becomes possible to make reference to shared data which is placed in other space within the family.

In addition, as described above, through the declaration that data in one virtual space can be made reference from the virtual space within the same family made by the program which has assigned that data, it becomes possible to make only the portion which has been opened for reference by the declaration to be an area which is granted to be made reference.

Consequently, data which has been assigned through the space family can be made reference without the overhead from a virtual space within the family, and at the same time it is protected from being made reference or revised from the outside of the family.

The following explains the access to the family common area. In FIG. 1, family common areas are created by setting the same entry for the family common areas of all segment tables that belong to a space family. It is designed that all entries 21a, 21b and 21c for the family common area 40a, 40b or 40c of the segment table 20a, 20b or 20c or the space a, b or c that belongs to the space family A points the page table 30a of space a. The spaces b and c are not provided with the page table for this family common area. The page table 30a points to the area 51 for shared data in the real storage 50. Accordingly, in case programs in the spaces a, b and c that belong to the space family A make reference to the family common areas 40a, 40b and 40c, respectively, the same real storage common area 51 is referenced.

Similarly, for the space family B, in case a program in the space d or e within the family makes reference to the family common area 40d or 40e, the same real storage area 52 is referenced. Although the real storage common areas 51 and 52 are shown as if they are a continuous area for the purpose of clarification, they need not be so.

For each space family, an area which controls areas are called child spaces. In this embodiment, the space c or d to which the page table 30a or 30d for family common area are assigned are parent spaces. In FIG. 1, different space families have different family common areas. Family common areas 40a, 40b and 40c of the family A and family common areas 40d and 40e of the family B are coincident in their virtual address, but they have different real storage areas resulting from the mapping through the segment table and page table. Accordingly, it is not possible to make reference to family common areas of families other than that to which it belongs.

Figure 3:
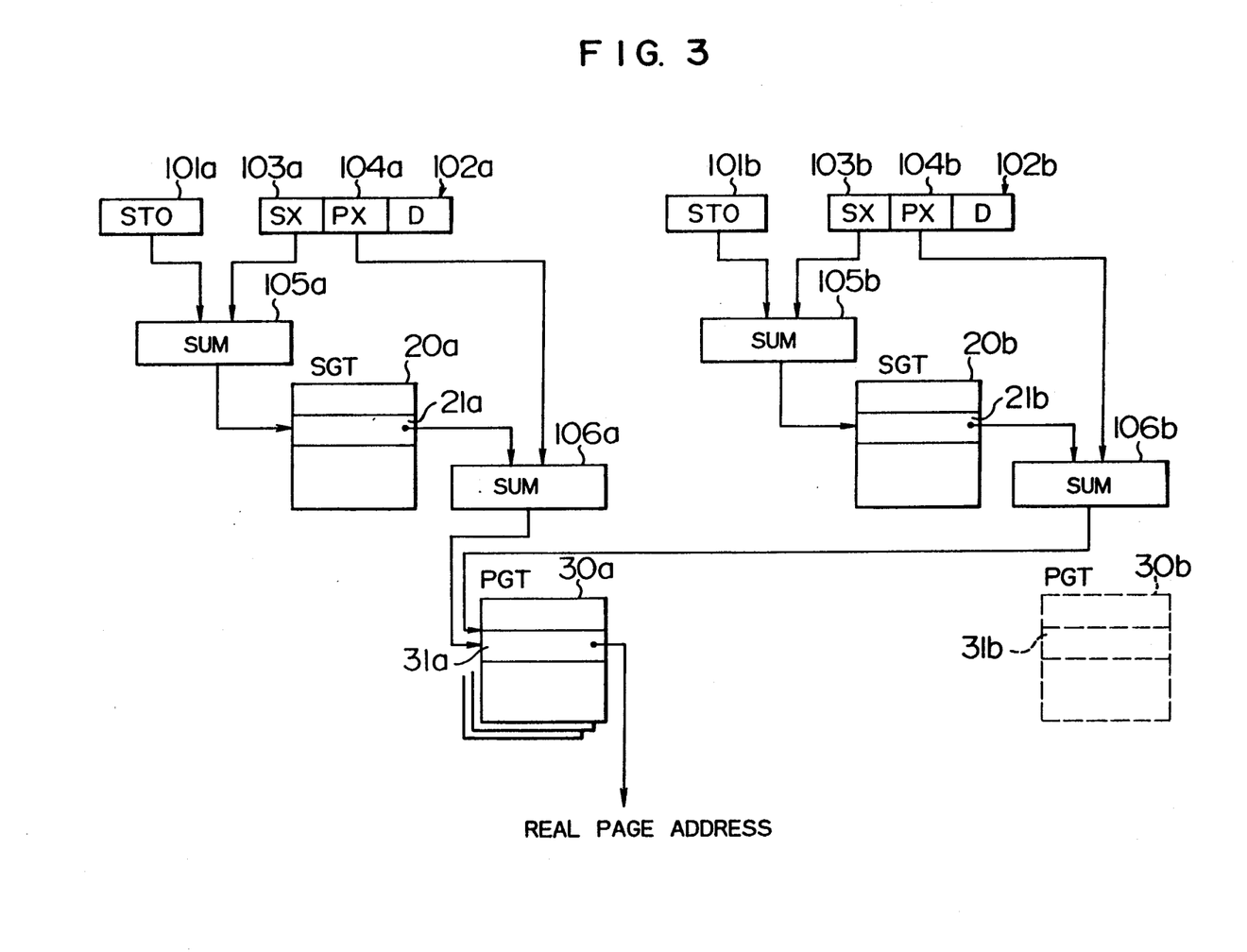
FIG. 3 is a diagram explaining in detail the procedure of address translation for the family common area according to this invention.

FIG. 3 shows in detail, only for spaces a and b, the relation between the segment table and page table necessary for setting family common areas of the space family A. Address translation when a program in the parent space a has made reference to the family common area 40a takes place as follows. Indicated by 102a is a register which holds the virtual address. For the purpose of clarification, this virtual address will be referred to with the reference number 102 being appended thereto. It is assumed that the virtual address 102a is a virtual address of the family common area 40a. The address of the segment table 20a for the space a is indicated by the segment table starting point (STO) in the register 101a. The virtual address 102a is divided into a segment index part (SX) 103a, a page index part (PX) 104a and a displacement part (D). Initially, the segment table starting point STO in the register 101a is added to the segment index part SX 103a by an adder 105a to evaluate the address of the corresponding entry 21a in the register 102a. The segment table entry 21a indicates the address of the page table 30a that contains the entry for the virtual address 102a, among a plurality of page tables 30a and so on. Next, the contents of the page table entry 21a are added to the page index part PX 104a by an adder 106a to select the entry 31a corresponding to the virtual address 102a of the page table 30a. The page table entry 31a stores the address of the real page for the virtual address 102a.

Similarly, address conversion when a program in the child space 10b has made reference to the family common area 40b takes place by using the virtual address 102b, segment table starting point (STO) 101b, segment index part (SX) 103b and page index part (PX) 104b. The only difference is that the entry 21b for the virtual address 102b of the segment table 20a indicates the page table 30a of the parent space 10a when the virtual address belongs to the common area 40b. Consequently, the result of addition of the contents of the page table entry 21b to the PX 104b indicates the entry 31a in the page table 30a. It is concluded that the result of address conversion for the virtual address 102b is identical in value to the address translation for the virtual address 102a.

The following explains the processing procedure executed by an operating system, from the creation until the deletion of a space family.

Figure 4:
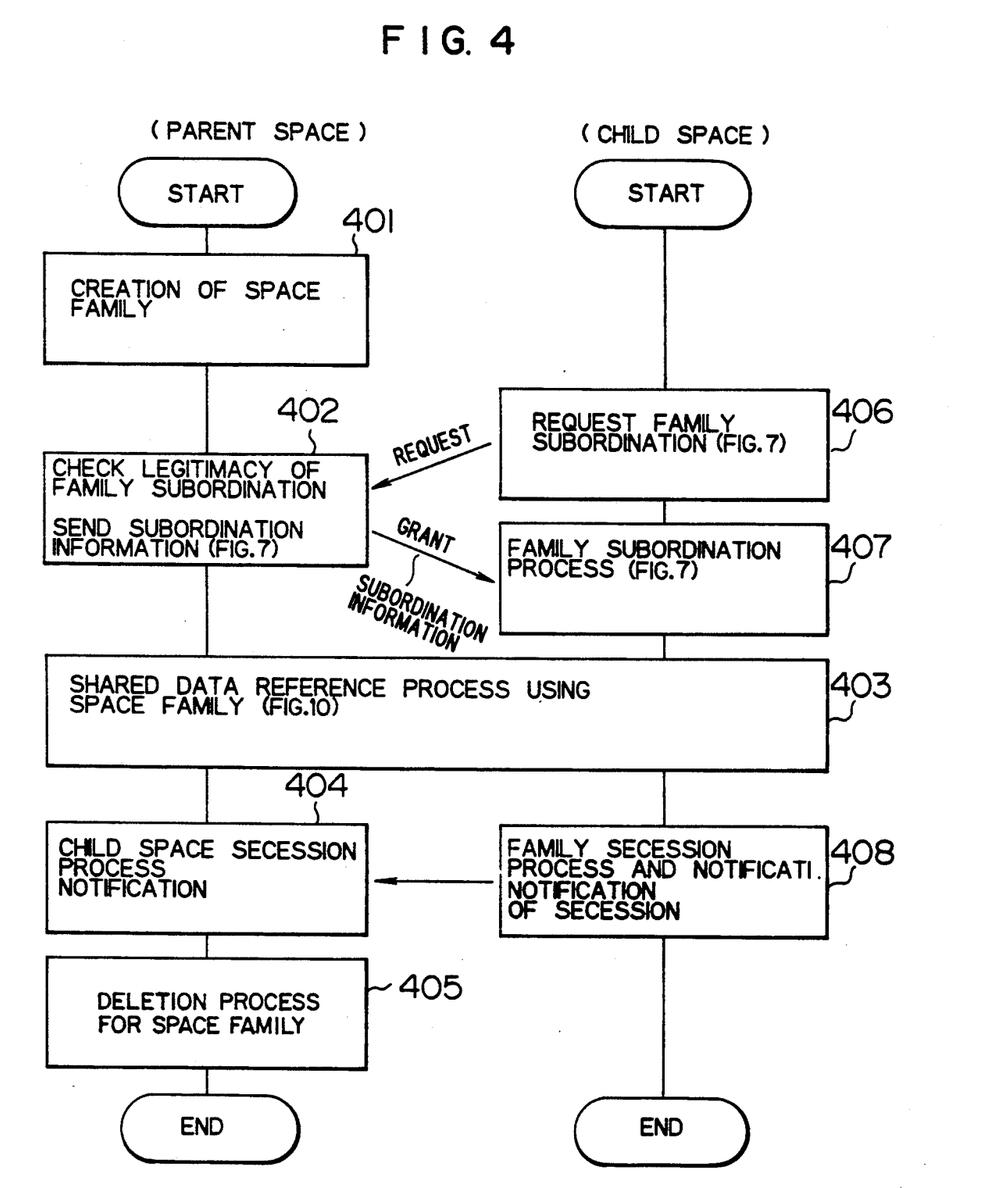
FIG. 4 is a flowchart showing in brief, as an embodiment of this invention, the procedure of process from the creation until the deletion of a space family applied to this group shown in FIG. 1 or 2.

FIG. 4 is a brief flowchart showing the processing procedure for constructing a space family. Shown here is an example of the case where space a is a parent space and space b is a child space. First, a program in the space a constructs a space family A, which is a new family, at a timing determined by the program, and waits as a parent space for another space to belong to that family (step 401). A program in the space b issues a request of subordination to the space family A at a timing determined by the program in advance, and indicates the request to the program in the parent space a (step 406). The details will be explained later in connection with FIG. 7. The space family to which the program is to belong discriminates whether or not the program is included on the basis of the information which is held in a portion of the operating system (not shown). Receiving the request, the parent space a checks whether or not the source of subordination request is eligible of subordination. This checking prevents the space, in which a program issuing an erroneous subordination request, from being added erroneously to the family. In case the subordination is to be granted, the parent space returns as subordination information the virtual address of a family common area 40b and the address of a page table 30a in the family common area 40b (step 402). The detail of this process will be explained later in connection with FIG. 7. Receiving the admission of subordination, the space b stores the received address of page table 30a in the entry 21b for the family common area 40b of the segment table 20b of its own space (step 407). As a result of the above procedure, the family common area 40b can be established, and the space b becomes a child space.

On completion of family subordination process, the programs in the parent space a and child space b perform the shared data referencing processes using the family common areas 40a and 40b (step 403). As an example of process, data created by a program in any space within the shared family is referenced by a program in another space within the family. At this time, spaces outside of the family cannot access the data. Such reference control of shared data is implemented by using a shared data management table 503 shown in FIG. 9 which is prepared in the common area created for that family, as will be described later. On completion of the process, the program in the child space b issues a notification of secession to the program of parent space at a predetermined timing (step 408). In this example, the segment table entry 21b of the family common area 40b which has been constructed in step 407 is restored to the value before the step 407. Receiving the secession notification, the parent space a implements the child space secession process (step 404). Specifically, the parent space a removes the space b from the list of child spaces shown by 453 in FIG. 6. Finally, the parent space implements the deletion process for the space family A at a timing determined by it (step 405).

The foregoing process is applied to a large-scale data base/data communication (DB/DC) system, for example. A large-scale DB/DC system generally comprises a control space and a plurality of subsidiary spaces, and each program runs on the basis of shared data. By application of a space family to this case, with the control space and subsidiary spaces being the parent space and child spaces, respectively, it becomes possible to speed up the data sharing among the control space and subsidiary spaces and enhance the data security.

The following explains the details of the foregoing process.

Figure 5:
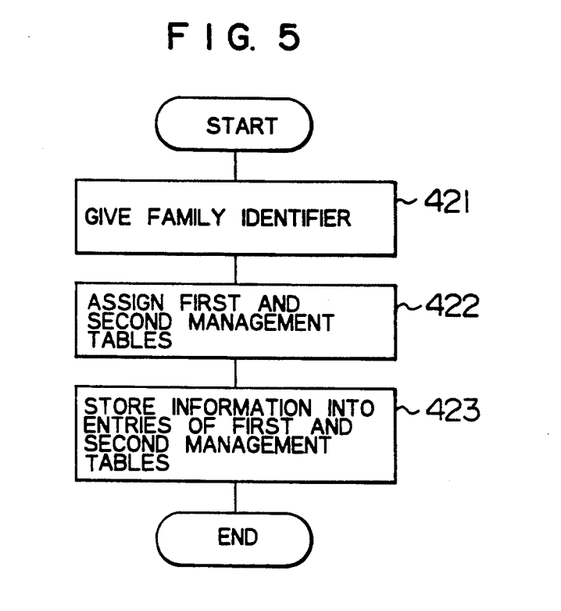
FIG. 5 is a flowchart showing the procedure of family definition.

FIG. 5 shows an embodiment for the family creation process 401. A family creation request is issued from a program in a space which is to be a parent space, e.g., in the control space of a DB/DC system, for creating a family common area with subsidiary spaces. The family creation process is implemented by the operating system (OS). At the issuance of a family creation request, a program in the space a, for example, passes the virtual address and size of the family common area 40a as parameters onto the OS. Receiving the request, the OS first appends an identifier to the space which is newly created (step 421). This procedure is intended to discriminate each of families existing in the computer system. Next, the OS allots first and second management tables 440 and 450 (FIG. 6) to the family (step 422). The first management table 440 is assigned in correspondence to each space family to the system common area 11a for storing information necessary at the subordination request from other space to the family. The second management table 450 is assigned to the parent space a and used for the subordination legitimacy check process. Necessary information are stored in each assigned management table, and the family creation process is completed (step 423).

Figure 6:
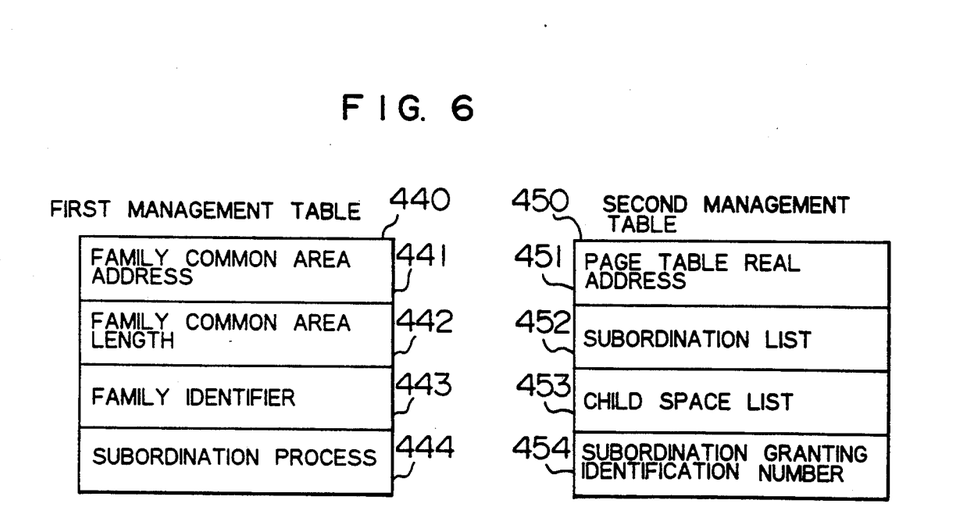
FIG. 6 is a detailed diagram of the tables (440, 450) used for the management of families.

As shown in FIG. 6, the first management table 440 comprises four entries. A family common area address 441 which represents the starting virtual address of the family common area 40a, and a family common area length 42 which represents the length of the family common area 40a. A family identifier 443 contains the identifier of the family which has been assigned in step 421. Subordination process initiation information 444 provides continuous information necessary for the initiation of the request destination program in case other space requests to belong to the family. Although the specific content of this information differs depending on each OS, the initiation of a program is a fundamental function of OS and any OS includes this information. In the case of VOS3, for example, a POST macro instruction is used to initiate a program, and the address of data called event control block (ECB) is stored for the initiation information 444.

The second management table 450 is assigned to the individual areas of the parent space a. A page table real address 451 represents the real address of the page table 30a of the family common area 40a of the parent space a. A subordination list 452 contains, if a family to which the parent space a already belong exists, the identifier of the family, and a child space list 453 is a list of child spaces which already belong to the family. The subordination granting identification number 454 is an identification number which is assigned in advance to a child space that is admitted to belong to the same family as of its parent space.

The following explains the specific use of the above-mentioned tables and their entries in connection with the subordination process.

Figure 7:
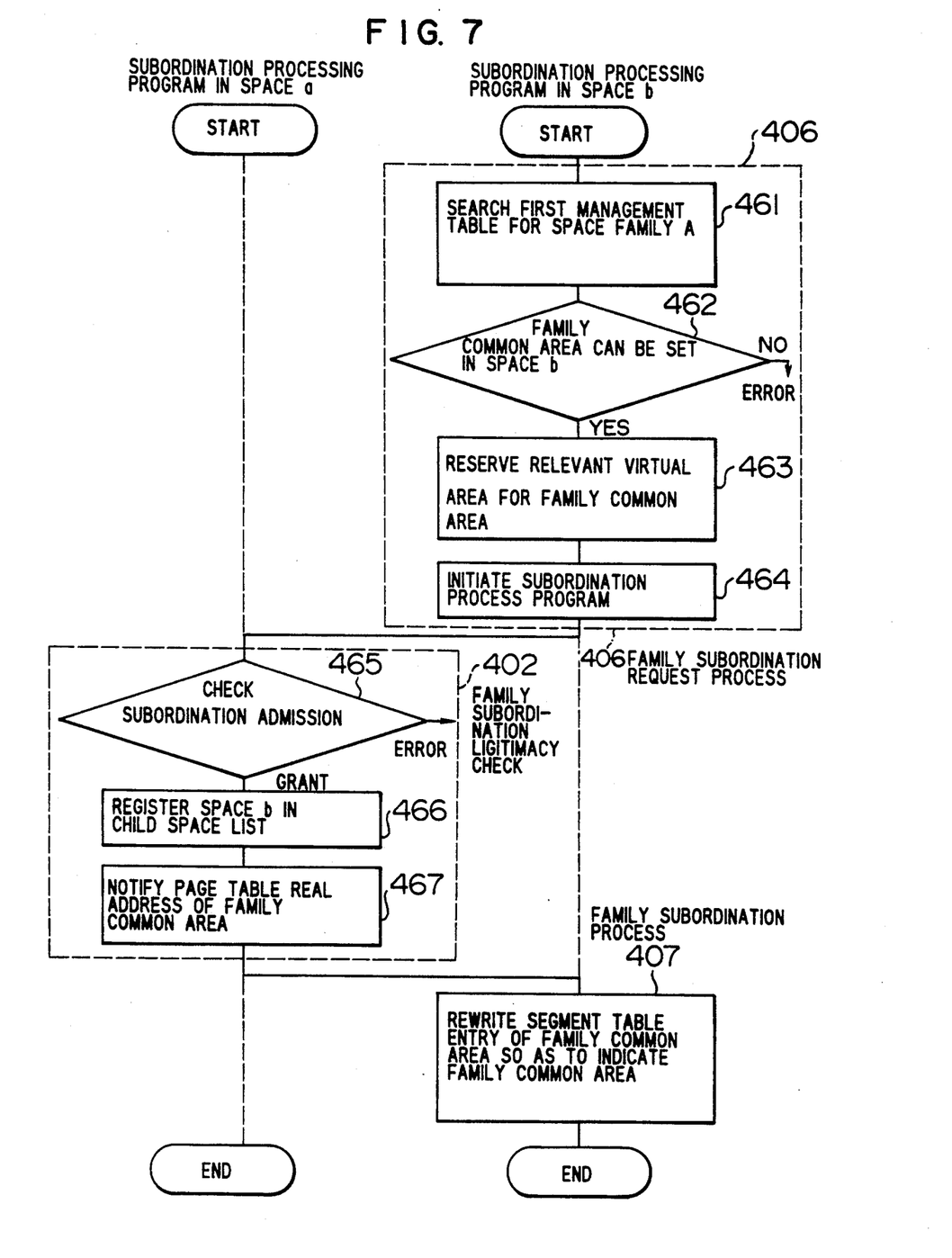
FIG. 7 is a flowchart of family subordination process.

FIG. 7 is a detailed flowchart of the space family subordination processes 406, 402 and 407. Here again, the explanation of an example is of the case where a program in the space b belongs to the space family A. In order for the program to belong to the space family A, the first management table 440 for the space family A is searched from the system common area 11a (step 461). Because of a plurality of families existing in the system, the first management table 440 with its family identifier 443 being associated with the family A is searched. Next, it is checked whether the setting of the family common area is feasible (step 462). Known from the virtual address of the family common area 40b of the family A, are the size of the area, the family common area address 441 of the first management table 440 for the family, and the family common area length. In case the virtual address for this family common area is already assigned to other purpose in the virtual space b, a common area cannot be set and subordination to the family A fails. In this case, an error message is returned, and control is transferred to the program diagnostic process. If, on the other hand, the area for the family common area 40b is not yet assigned to other purpose, this area is reserved for the common area 40b for the family A (step 463). Next, the subordination process initiation information 444 of the first management table 440 is used to initiate the subordination processing program in the parent space a (step 464). At this time, the program in the space which is granted to belong to the target family sends the subordination admission identification number to the subordination processing program. The identification number is determined for each family, and a program which is known to be admitted to belong to one family is informed in advance of the identification number determined for the family Receiving the subordination request, the subordination processing program checks as to whether or not the subordination of the requesting space is granted (step 465), thereby preventing a wrong space from having subordination. Specifically, the identification number sent from the requesting program is collated with the identification number in the second management table for this family. Unless both numbers match, subordination is not granted. In case both numbers match, the subordination processing program further checks, in case the requesting space already belongs to other space family, as to whether or not all spaces in the space family are included in the set of space families to which the parent space already belongs (step 465). This process is carried out by using the second management table 450 of the family to which the parent space a belongs and each subordination list 452 of the second management table for the family to which the space b belongs. This is intended to ensure the hierarchical organization of space families. For example, in case a space h belongs to a family D in FIG. 2, families to which the parent space f of family D belongs are D and C. Families to which the space h belongs are C and E. Accordingly, the family E in the latter group does not belong to the former, and therefore the space h cannot belong to the family D. In case it is intended that a space k belongs to the family D, C is the only family to which the space k belongs, and it is part of families C and D to which the parent space f belongs, and therefore the space k is admitted to belong to the family D. If, in step 465, the set of space families, to which the requesting space b already belongs, is included in the set of space families to which the parent space a already belongs, subordination is granted. Otherwise, subordination is inhibited, and the request results in an error return. The program in the requesting space proceeds to the program diagnostic process. In case the subordination request is granted, the requesting space b is registered in the child space list 453 in the second management table for the parent space a (step 466), and the page table real address 451 of the family common area is notified as return information to the requesting space b (step 467).

In case the request is accepted, the subordination requesting program replaces the segment table entry 21b for that family common area 40b with the page table real address 451, which is the previously notified information, in the family subordination process 407, as has been described previously. Through these operations, the family common area 40b has been made accessible.

Figure 8:
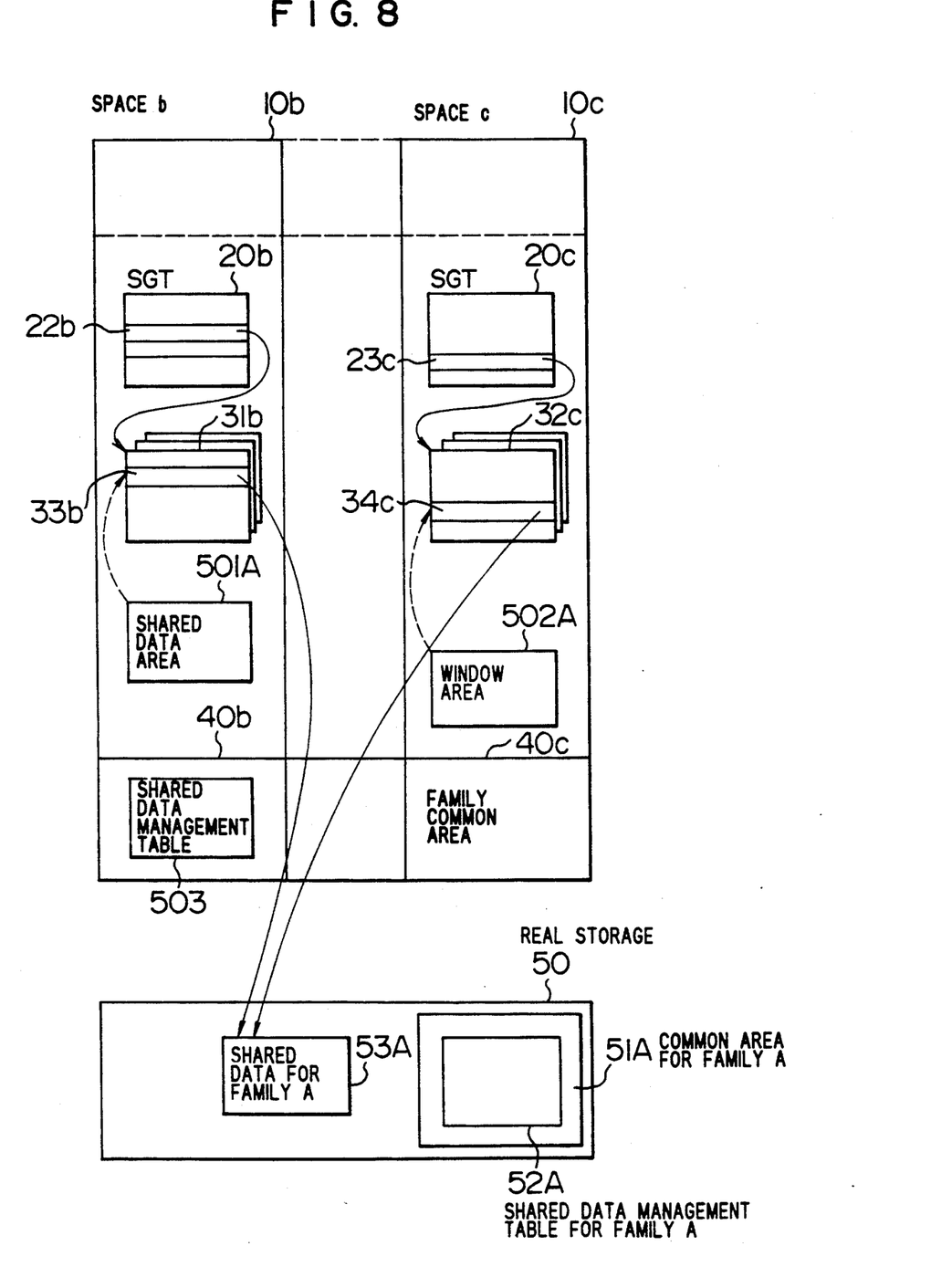
FIG. 8 is a diagram used to explain the referencing to family shared data.

Next, a method of practicing the space referencing using a window, which is an embodiment of the shared data reference process 403 (FIG. 4) will be described. The following explains the method of sharing the system common area and areas other than the family common areas by the child spaces b and c of the family A in the example of FIG. 1. More specifically, as shown in FIG. 8, a shared data area 501 assigned to the individual area of the space b is referenced through a window area 502 having the same size assigned to the individual area of the space c. A key point here is that the page table entry 33b for the address translation of the virtual address of each virtual page of the shared data area 501 and the page table entry 34c for the address translation of the virtual address of each virtual page of the window area 502 point a shared real page 53 in the same real storage 50.

The address of the page table entry 33b for each virtual page of the shared data area 501 is obtained in the same manner as has been explained using FIG. 3. Namely, the address of the corresponding entry 22b in the segment table 20b is obtained by using the segment index part sx of the virtual address of each virtual page of the shared data area 501, and address of the corresponding entry 33b in the page table 31b is obtained from its contents and the page index part px of the virtual address. Similarly, the address of the page table entry 34c corresponding to each virtual page of the window area 502 can be obtained. In order for both page table entries 33b and 34c to have equal contents, a shared data management table 503 is allotted to the family common areas 40b and 40c in advance.

Figure 9:
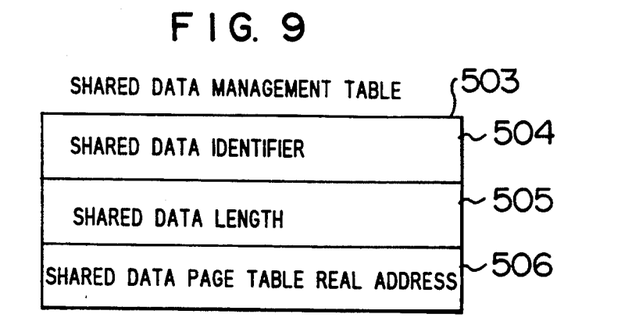
FIG. 9 is a detailed diagram of the management table which manages the family shared data.

FIG. 9 shows the arrangement of the shared data management table 503. A shared data identifier 504 is used to identify the shared data area 501, and it is necessary to allow the presence of a plurality of shared data areas in a space family. The shared data length 505 is equal to the length of the shared data area 501. The real address of shared data page table is equal to the real address of the page table entry 33b of shared data (the address of the stored location of this entry in the real storage 50).

Figure 10:
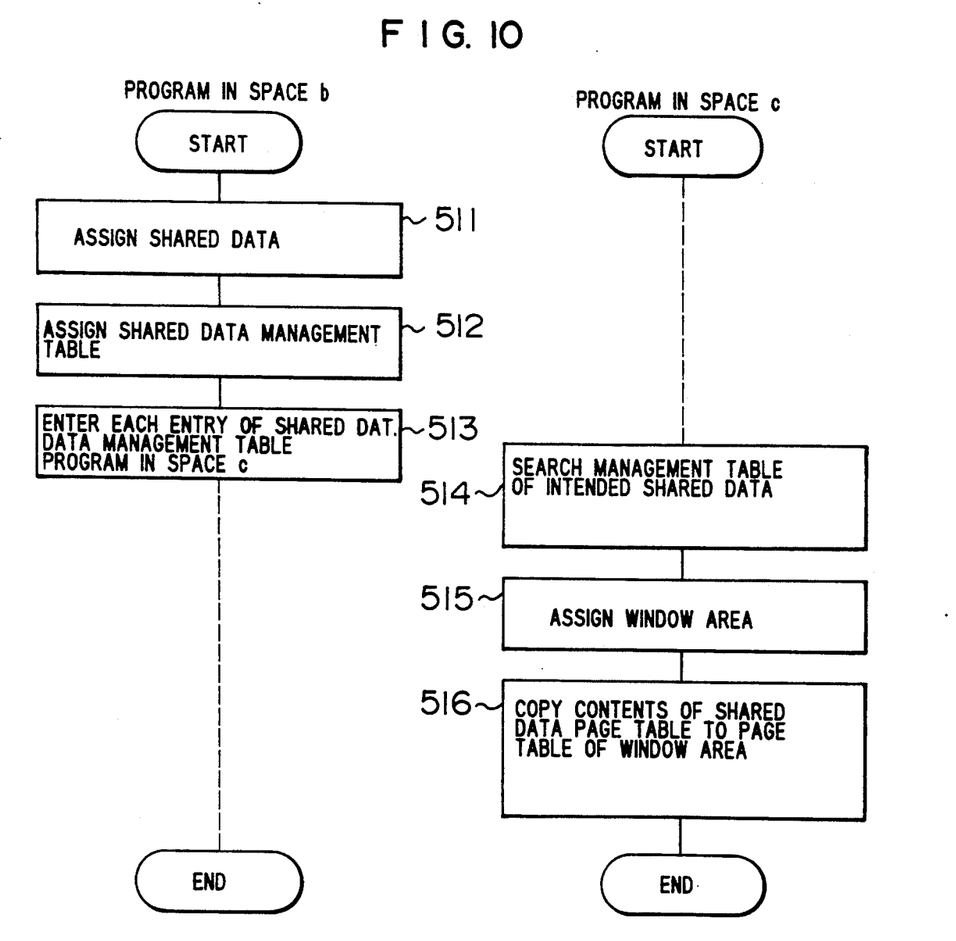
FIG. 10 is a flowchart showing the procedure of referencing shared data through the window.

FIG. 10 shows the processing procedure for constructing the table structure shown in FIG. 8 using the shared data management table 503.

The program of the space b in FIG. 1 is registered, with data in the space b being used as shared data. First, the shared data is placed in the individual area of the space b (step 511). Next, the shared data management table 503 (FIG. 8) is laid out in the family common area 40b (step 512). The identifier 504 of shared data, the data length 505 of shared data and the real address 506 of the page table entry of the shared data are written in the laid-out management table 503 (step 523). Through these operations, the preparation for the sharing of the shared data 501 by other space which belongs to the family A has completed.

Based on this condition, the program in the space c shares the shared data 501. First, the contents of the shared data management table 503 (FIG. 8), which has been laid out in part of the family common area 40c, is read out from the shared data management real table 503R, that is located in part of the common real area 51 for the family A within the real storage 50, in the manner explained in connection with FIGS. 1 and 2, so as to find a management table 503 having a shared data identifier 504 which represents the intended shared data 501. Next, a window area 502 having the same length as the shared data length 505 is laid out in the individual area of the space c. The contents of the page table entry 33b of the shared data is copied to the page table entry 34c of the laid-out window area 502, by using the shared data page table real address 506. The contents of the page table entry 33b for the space b is read out of the real storage 50, and it is copied to the page table entry 34c for the space c. Supposing that the shared data 53 in the window area 502 is assigned to the program in the space c, the designation of a virtual address of each virtual page of the window area 502 provides a real page corresponding to the real shared data 53 in the real storage 50 as a result of address translation for the virtual address, and the access from the real shared data 53 is made possible. Accordingly, it becomes possible the creation of real shared data 53 by a program in the space b and the referencing of the data by a program in the space c, and vice versa, and the sharing of data is made possible.

Figure 11:
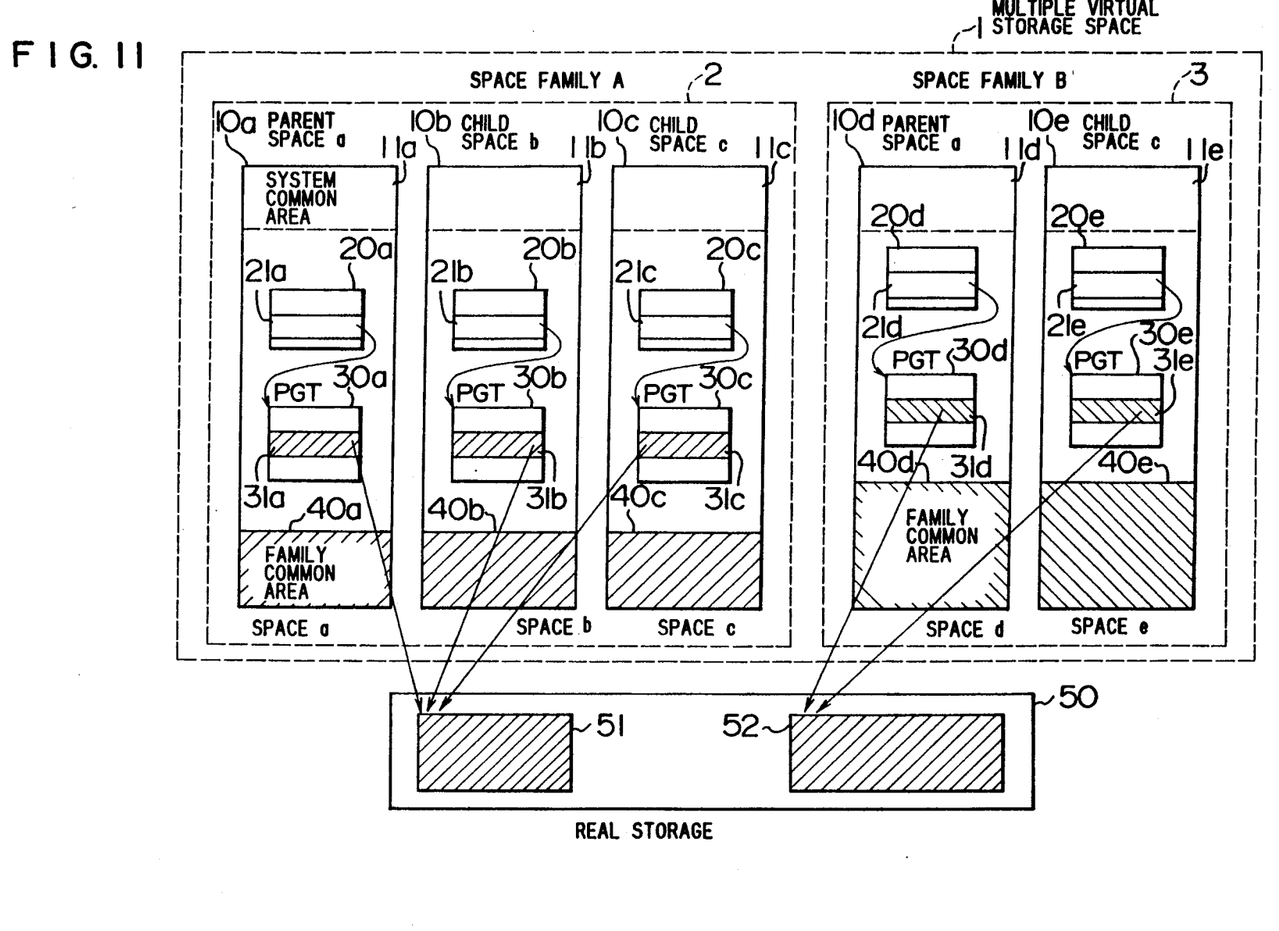
FIG. 11 is a diagram showing in brief a still different space family group according to this invention.

FIG. 11 shows another embodiment of the method of setting a family common area. In this embodiment, the page table entry is given a same value, instead of retaining the segment entry of each space constant. Page table entries 31a, 31b and 31c for all family common areas of the spaces a, b and c that belong to the family A are designed to have a same value so that they all point the real storage area 51. Similarly, page table entries 31d and 31e for all family common areas of the spaces d and e that belong to the family B are designed to have a same value so that they all point the real storage area 52. Through these operations, family common areas specific to each family can be set. The case of FIG. 11 differs from the case of FIG. 1 in that it becomes possible to have shared data provided for the family common area, e.g., shared data management data in FIG. 1, placed across the boundary of segments. In the case of FIG. 1, the shared data management data must be provided in such a manner that it belongs to a single segment. In the case of FIG. 1, the page tables 30b and 30c (FIG. 11) are unnecessary, and the real storage management for the family common area is implemented in the real storage as follows The resource management is implemented on assumption that the real storage assigned to the family common area belongs to the parent space. In case a child space is swapped out, nothing is implemented for the page table corresponding to the family common area and the real storage. At the swap-in process for a child space, the entry corresponding to the family common area of the segment table of the child space is converted so that the result indicates the page table of the family common area of the parent space of that family, in the case of FIG. 1. At the swap-in process for a child space, in the case of FIG. 11, the contents of the page table of the family common area of the parent space of that family is copied to the page table corresponding to the family common area of the child space.

As described above in detail, the inventive multiple virtual storage management method creates space families that integrate a plurality of virtual spaces in the system and provides in the space family a family common area that can reference only its interior, whereby it becomes possible to share and revise data among spaces within a family by way of the family common area. Accordingly, it becomes possible to reference data located in a space in the family, as if it is data in its own space, by using only the identifier given to that data and the relative address of the intended record in the data. In addition, it is not possible for a virtual space which does not belong to the family to make reference to the data, and the data security is retained.

The address translation table and the like necessary for the reference of data shared within a family is disposed in the family common area, and it is advantageous in the capability of easy reference to shared data located in other space within the family

We claim:

1. A multiple virtual storage management method for an information processing system including multiple virtual storage having a plurality of space families each made up of a plurality of virtual spaces, each virtual space which belongs to one of said being provided in an individual area of said multiple virtual storage, wherein a family common area is provided for each space family, said family common area having information common to each of the virtual spaces of the space family, said method comprising the steps, performed by said information processing system of;
   (a) requesting, by a first program allocated to a first virtual space, subordination of said first virtual space to a first one of said space families at a timing determined by said first program;
   (b) subordinating said first virtual space to said first family in response to said requesting subordination step;
   (c) requesting, by a second program allocated to a second virtual space which is subordinated to a second one of said space families, secession from said second space family at a timing determined by said second program; and
   (d) permitting said second virtual space to secede from said second space family in response to said requesting secession step.

2. A multiple virtual storage management method according to claim 1, wherein said step (b) comprises the steps, performed by said information processing system, of:
   (b1) judging whether or not said first virtual space satisfies a condition for subordination to said first space family; and
   (b2) subordinating said first virtual space to said first space family if said condition is met.

3. A multiple virtual storage management method according to claim 1, wherein said step (b) comprises the step, performed by said information processing system, of:
   subordinating said first virtual space to said first space family even if said first virtual space is already subordinated to another one of said space families.

4. A multiple virtual storage management method according to claim 3, wherein said step (b) further comprises the steps, performed by said information processing system, of:
   (b1) judging whether or not said first and another plurality of space families satisfy a predetermined condition so as to enable said space families to organize in a hierarchical space family structure; and
   (b2) subordinating said first virtual space to said first space family if said predetermined condition is met.

5. A multiple virtual storage management method according to claim 4, wherein said predetermined condition includes a condition that a first set of space families including said another space families, to each of which said first virtual space is subordinated, is a subset of a second set of space families including said first space family, to each of which at least one of virtual spaces subordinated to said first space family is subordinated.

6. A multiple virtual storage management method for an information processing system including a multiple virtual storage having a plurality of space families each made up of a plurality of virtual spaces, each virtual space which belongs to one of said space families being provided in an individual area of said multiple virtual storage, wherein a family common area is provided for each virtual space of a space family, said family common area having information common to each of the virtual spaces of the space family, said method comprising the steps, performed by said information processing system, of:
   (a) declaring, by a program allocated to a virtual space (parent space), creation of a space family, and specifying an address and a size of a family common area to be formed in said space family;
   (b) forming a family common area of the specified size at the specified address in said parent space;
   (c) declaring, by a program allocated to another virtual space (child space), subordination of said child space to said space family; and
   (d) forming a family common area with the specified size at the specified address of an individual area in said child space.

7. A multiple virtual storage management method according to claim 6, wherein said step (d) comprises the step, performed by said information processing system, of:
   altering content of an entry corresponding to said family common area formed in said child space among a plurality of entries of a segment table for said child space, so as to point to a page table for said family common area formed in said parent space.

8. A multiple virtual storage management method according to claim 7 further comprising the step, performed by said information processing system, of:

assigning to said child space, a segment table which has an entry for said family common area formed in said child space, indicative of said page table of said family common area formed in said parent space, when said child space is swapped-in after being swapped out.

9. A multiple virtual storage management method according to claim 6, wherein said step (b) comprises the step, performed by said information processing system, of:

copying content of said page table for said family common area formed in said parent space to a page table for said family common area formed in said child space.

10. A multiple virtual storage management method according to claim 8 further comprises the step, performed by said information processing system, of:

assigning to said child space, a page table for said family common area formed in said child space, which holds a same content as said page table for said family common area formed in said parent space, when said child space is swapped in after being swapped out.

11. A multiple virtual storage management method for an information processing system including a multiple virtual storage having a plurality of virtual spaces, each virtual space which belongs to one of said space families being provided in an individual area of said multiple virtual storage, wherein a family common area is provided for each space family, said method comprising the steps, performed by an information processing system, of:

(a) declaring, by a first program allocated to a first virtual space, subordination of said first virtual space to a space family, wherein data selected from data allocated to said first virtual space to be in-family shared data, is made accessible to other virtual spaces within said space family;

(b) allocating to a family common area of said space family, a shared data management table including an identifier, data length and a real address of an address translation table used for referring to said in-family shared data;

(c) accessing said shared data management table by a second program allocated to a second virtual space which is subordinated to said space family;

(d) assigning a window area to be used for accessing said shared data by said second virtual space in accordance with said shared data management table; and (e) altering a content of an entry for said window among entries of a segment table for said second virtual space in accordance with said shared data management data, so as to enable said entry to indicate a page table assigned to said in-family shared data.

12. A multiple virtual storage structure for real storage assignment used in an information processing apparatus, comprising:

a plurality of space families each made up of a plurality of virtual spaces, each virtual space being subordinated to at least one of said space families in an individual area of said multiple virtual storage; and a family common area common to virtual spaces of each space family, said family common area having information common to said virtual spaces of said each space family;

said space families being arranged hierarchically so that all virtual spaces which belong to a space family of a lower level belong to a space family of a higher level and different space families of a same level do not include a same virtual space.

* * * * *